Figure 1:
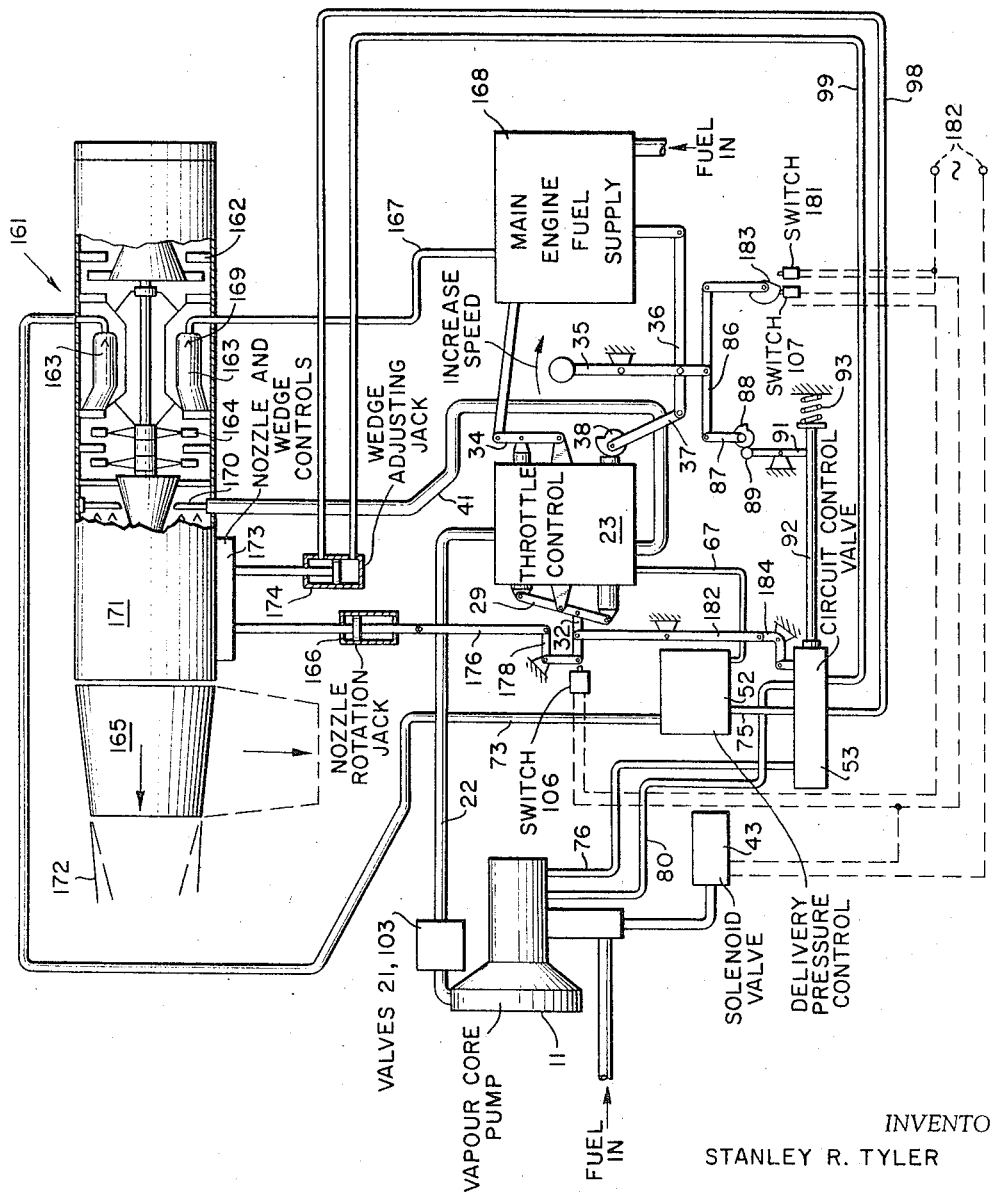

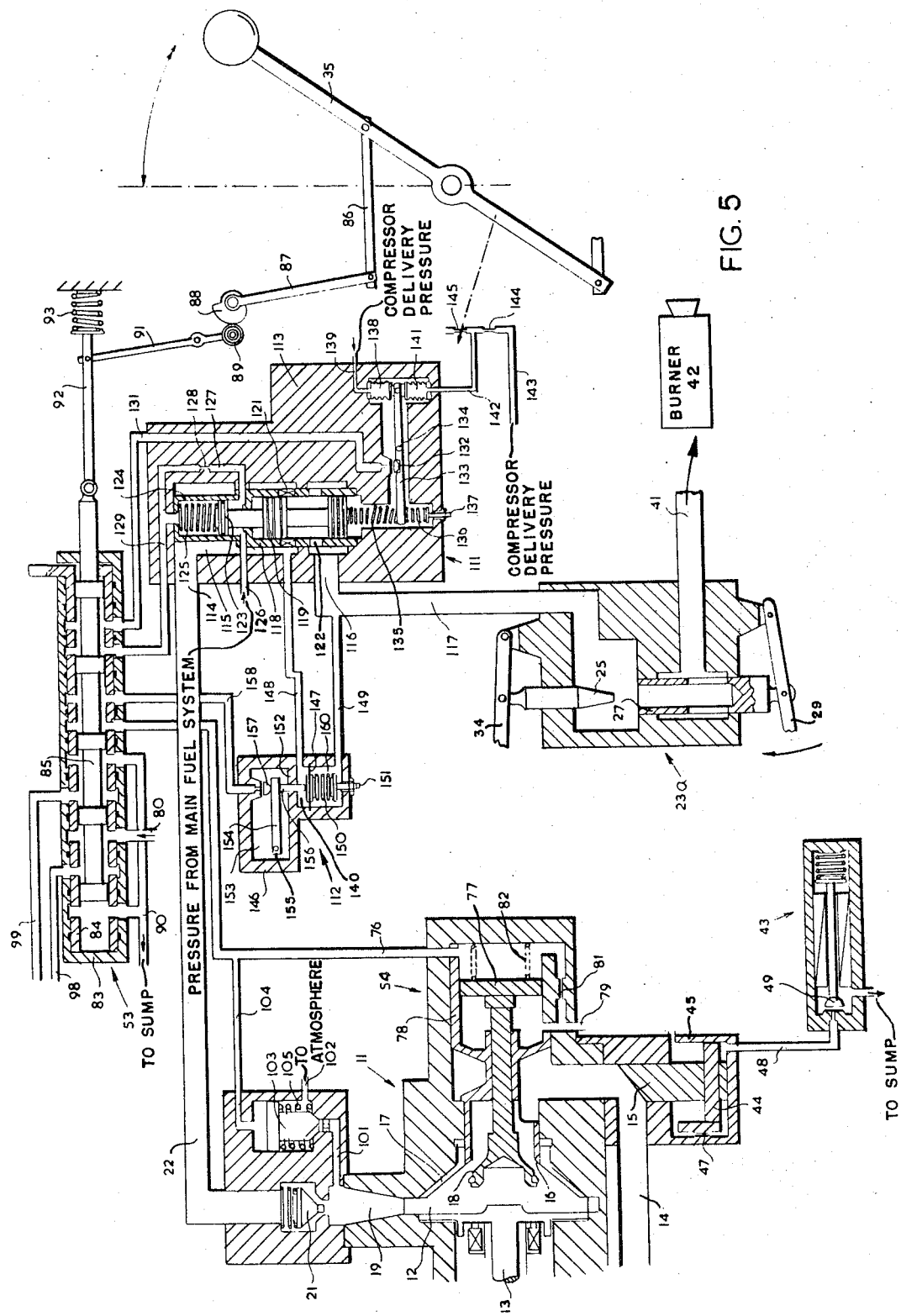

United States Patent Office 3,301,309
Patented Jan. 31, 1967

3,301,309
FUEL CONTROL SYSTEMS FOR GAS
TURBINE ENGINES
Stanley R. Tyler, Cheltenham, England, assignor to Dowty
Fuel Systems Limited, Cheltenham, England
Continuation of application Ser. No. 228,956, Oct. 8, 1962.
This application Jan. 21, 1965, Ser. No. 428,602
4 Claims. (Cl. 158—36.3)

This application is a continuation of application Serial No. 228,956, filed October 8, 1962 and bearing the title "Liquid Flow Control Systems," now abandoned.

This invention relates to fuel control systems for gas turbine engines.

The present invention provides a fuel control system for a gas turbine engine, including a centrifugal fuel pump, means for controlling the flow of fuel in the system by throttling the flow of fuel into the pump and alternative means for controlling the flow of fuel in the system by throttling the flow of fuel out of the pump, one means being operative under one operating condition and the other means being operative under another operating condition.

One means, for example the inlet controlling means, may be normally operative while the other means is arranged to become operative if the first means fails. Alternatively, one means, for example the outlet controlling means, may be normally operative while the other means is arranged to become operative if the fuel becomes too hot. As another alternative, one means, for example the outlet controlling means, may be operative while the engine is accelerating while the other means is operative at other times.

The invention is also useful as a fuel control system for a gas turbine of an aircraft capable of vertical and horizontal flight, the thrust from the engine being capable of supporting or partly supporting the weight of the aircraft, as well as propelling the aircraft forwardly. For convenience, aircraft flight in which the weight of the aircraft is supported or partially supported by the engine will be referred to as transitional flight and aircraft flight in which the engine propels the aircraft forwardly without directly supporting or partly supporting the weight of the aircraft, that is when the wings provide the necessary lift, will be referred to as forward flight. One means, for example the inlet controlling means, may be operative during forward flight while the other means is arranged to be operative during transitional flight.

Some aircraft gas turbine engines have so-called afterburners which are additional to those burners located between the compressor and the turbine, for example to burn fuel in air leaving the turbine or to burn fuel in air which has passed through the compressor but which has been diverted from the flow of gas passing to the burners located between the compressor and the turbine.

A fuel control system according to the invention may be used to control the flow of fuel to these additional burners. For an aircraft capable of forward and transitional flight, the fuel flow controlling means operable when the aircraft is in transitional flight may control the flow by throttling at the outlet of the pump so that the rate of fuel flow to the additional burners is a function of the rate of fuel flow to the main burners located between the compressor and the turbine. In this case, the pump functions as a normal centrifugal pump.

The fuel flow controlling means operable when the aircraft is in forward flight may control the flow of fuel by means of throttling the inlet to the pump so that the rate of fuel flow to the additional burners is the function of a gas pressure which is a signal of an engine operating condition, for example compressor delivery pressure. In this case the pump may function as a vapour core pump within the scope of U.S. Patent No. 3,128,822.

Figure 2:
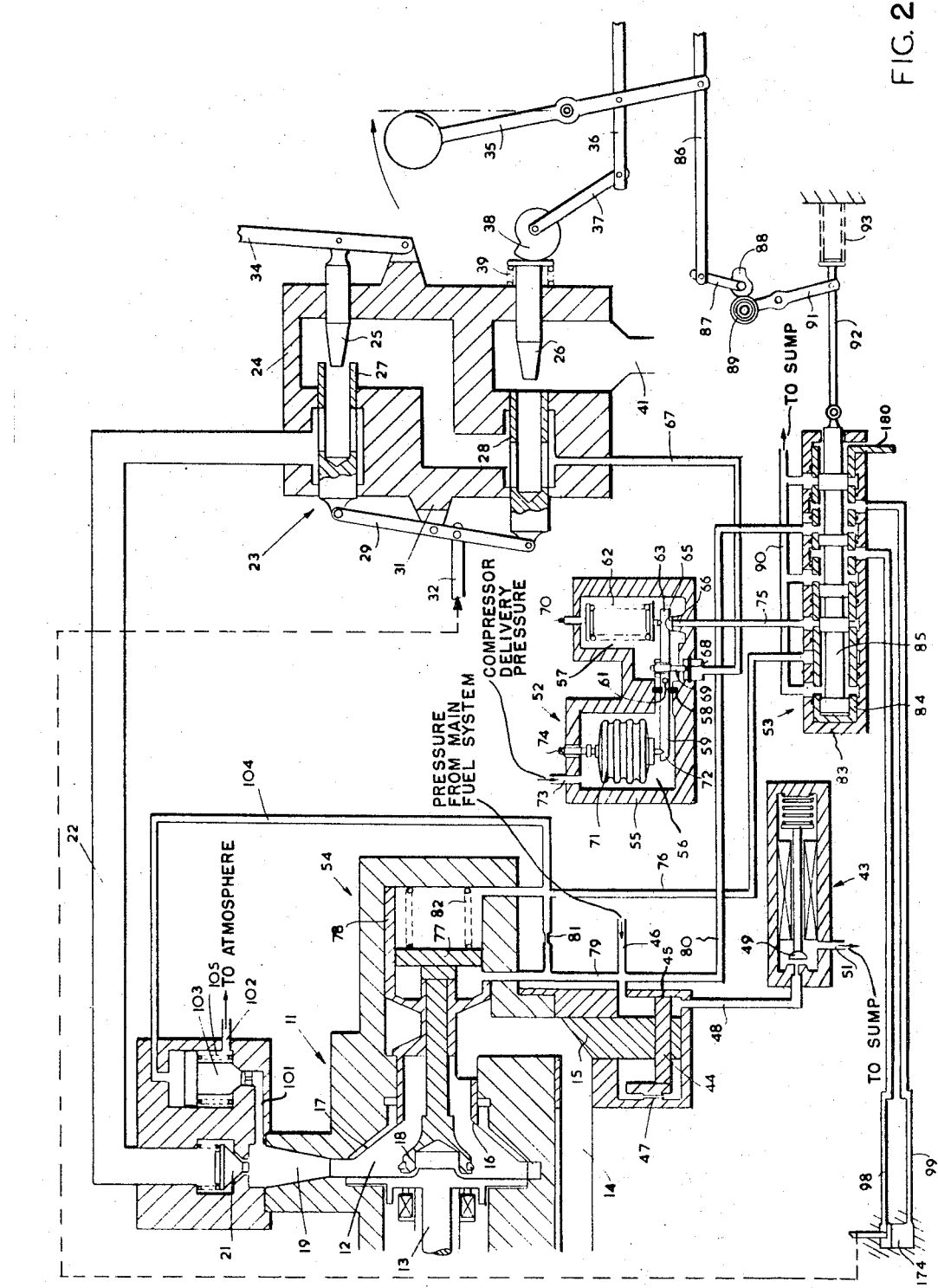
Figure 3:
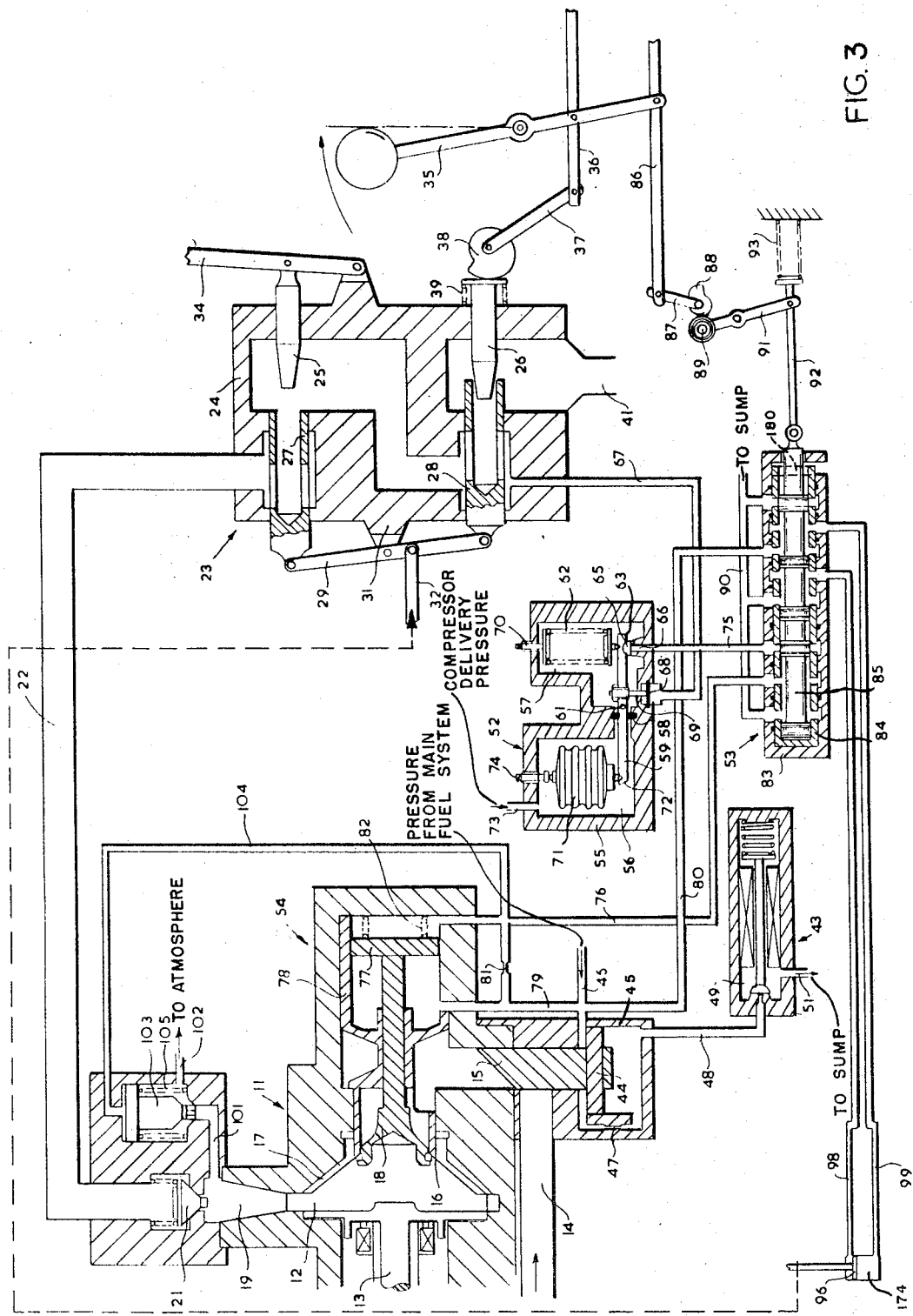
Figure 4:
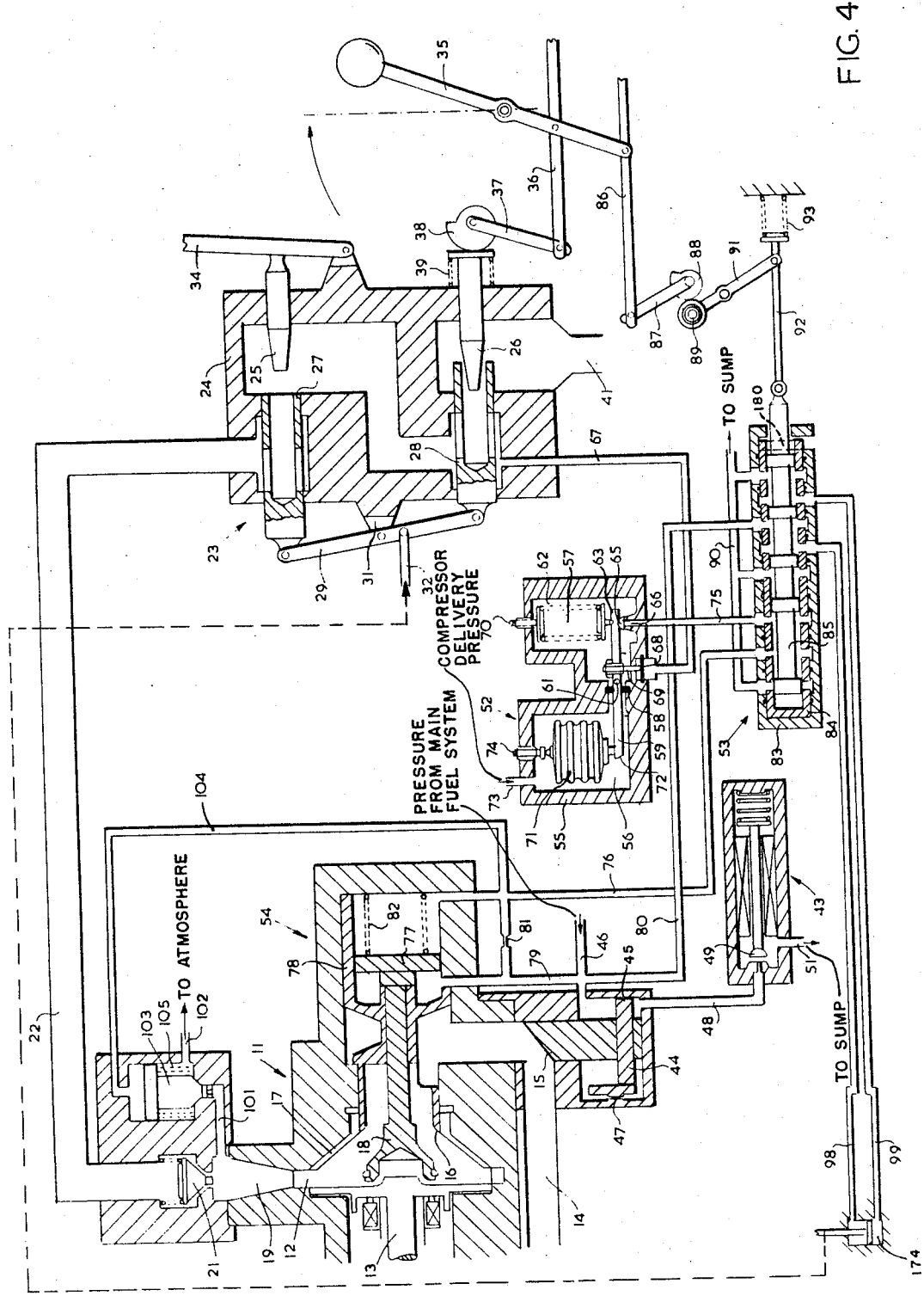

Two embodiments of the present invention will now be described, by way of example, with reference to the accompanying drawings of which, FIGURE 1 is a diagrammatic view of a fuel control system according to the invention when functioning to supply fuel to additional burners of an aircraft gas turbine engine;

FIGURE 2 is a similar view of the fuel control system when the aircraft is in transitional flight, FIGURE 3 is a similar view showing the fuel control system of FIGURE 1 when the aircraft is in forward flight with additional burners inoperative, FIGURE 4 is a similar view showing the fuel system of FIGURE 1 when the aircraft is in forward flight with additional burners operative, and, FIGURE 5 is a diagrammatic view of a fuel control system according to a second embodiment of the invention shown when functioning to supply fuel to the additional burners of an aircraft gas turbine engine when the aircraft is in forward flight, The aircraft gas turbine engine is designated generally by reference numeral 161 in FIGURE 1. As there shown, the engine comprises a compressor 162 providing high pressure combustion air to a plurality of combustion chambers 163 the combustion gases from which discharge through a turbine 164 to drive the compressor, and then exhaust through the engine nozzle 165 to provide the desired thrust. The nozzle is angularly adjustable, as indicated, between a downwardly directed attitude in which it produces a direct lifting force in transitional flight, and a rearwardly directed attitude in which it produces propulsive thrust in forward flight. Rotation of the nozzle is effected by a jack 166 which is energized by the pilot and operative through a control panel 173 connected with the nozzle.

Fuel to the engine main combustion chambers 163 is provided through a line 167 interconnecting the engine main fuel supply system 168 to spill nozzle elements 169 in the combustion chamber 163. For the sake of simplicity, only the supply line is shown, the spill return line being omitted. The engine is also equipped with additional burners on an afterburner fuel supply manifold 170 arranged to eject a spray of fuel into the engine tail pipe 171 downstream of turbine 164. With the engine thus equipped for afterburning, controlled variation of the engine nozzle exhaust area is desirable, and toward this end, the nozzle 165 is provided with flaps or wedges 172 for varying the exit area of the nozzle. The wedges are adjusted by a jack 174 which is operative through controls in the panel 173 connected to the wedges.

Referring now to FIGURES 1 to 4, it will be seen that the fuel control system for the additional burners of an aircraft gas turbine engine includes a vapour core fuel pump 11 within the scope of U.S. Patent No. 3,128,822. The pump 11 includes a rotor 12 mounted on a shaft 13 driven by the engine. Fuel is supplied to the system from a boost pump through a conduit 14, through a shut-off valve 15 and through an orifice 16 into the chamber 17 in which the rotor 12 is located. The area of the orifice 16 can be controlled by a valve 18 whose operation will be described later.

Fuel leaves the pump 11 through an outlet 19 and passes through a nonreturn valve 21 and a conduit 22 into a throttle control 23. The throttle control 23 includes a housing 24 which houses two throttles 25 and 26 and only one of these throttles is operative at any one time. The throttle 25 cooperates with a throttle member 27 and is operative only when the thrust from the engine is supporting or partly supporting the weight of the aircraft, as for example in landing or taking off, and the throttle 26 cooperates with a throttle member 28 and is operative only when the aircraft is in forward flight.

The throttle members 27 and 28 are slidably mounted in the housing 24 and are pivotally connected to opposite ends of a lever 29 which is pivotally connected adjacent its midpoint to a lug 31 on the housing 24. A lever 32 pivotally connected to the lever 29 is controlled by the nozzle rotation jack 166 so that when the aircraft is in transitional flight, the throttle member 28 is withdrawn from the throttle 26 to render the throttle 26 inoperative, and the throttle member 27 is advanced towards the throttle 25 to render the throttle 25 operative as shown in FIGURE 1. When the aircraft is in forward flight, the lever 32 is actuated to withdraw the throttle member 27 from the throttle 25 to render the throttle 25 inoperative and to advance the throttle member 28 towards the throttle 26 to render the throttle 26 operative as shown in FIGURE 3.

The nozzle rotation jack 166 acts on the lever 32 in conventional manner through a pivotally interconnected linkage comprised of link 176 and bell crank 178.

The throttle 25 is slidable in the housing 24 and its movement is controlled by the spill valve in the engine main fuel supply system 168 through a lever 34. The spill valve controls the flow of fuel to the main burners of the engine in a manner which is described in connection with elements 16, 17, 18 and 19 in U.S. Patent No. 2,738,003, and in turn controls its rotational speed. Similar kind of control can be obtained in other ways such, for example, by coupling to the swash plate mechanism of a variable stroke engine supply pump.

The throttle 26 is also slidable in the housing 24 and is controlled by movement of the engine main throttle control lever 35 through levers 36 and 37. Lever 37 carries a cam 38 against which throttle 26 is resiliently urged by a helical spring 39.

Fuel leaves the throttle control 23 through an outlet 41 and flows to the afterburners of manifold 170. The afterburners may be spray nozzles which are constructed to give a linear relationship between fuel pressure and rate of fuel flow from the nozzle.

The afterburner fuel control system also includes an electrical solenoid valve 43 which controls the fuel shut-off valve 15 by means of a servomechanism. The servomechanism includes a piston 44 carried by the shutoff valve 15 and slidable in a cylinder 45. Servo-liquid in the form of high pressure fuel from a fuel pump in the main fuel supply system of the engine is supplied through a conduit 46 to one side of the piston 44 from whence it passes through a restrictor 47 to the other side of the piston 44. This other side of the piston 44 communicates through a conduit 48 with the electrical solenoid valve 43, which includes a valve member 49 which closes the conduit 48 when the solenoid valve 43 is not actuated.

When the solenoid valve 43 is actuated, it moves the valve member 49 away from the end of the conduit 48 to allow the fuel to flow from the conduit 48 into a conduit 51 which returns the servo fuel to the sump pump in the aircraft fuel tanks. Thus fuel flows through the restrictor 47 and the pressure on the downstream side of the restrictor 47 drops and the resultant force of the fuel on the piston 44 causes the shutoff valve 15 to open.

The delivery pressure of the vapour core pump 11 is controlled by a delivery pressure control 52 which acts, when the aircraft is in forward flight, through a circuit control valve 53 to control a servomechanism 54 which actuates the valve 18 in the vapour core pump 11. The circuit control valve 53 will be described in more detail later.

The delivery pressure control 52 includes a housing 55 divided into two chambers 56, 57 by a seal 58. A lever 59 extends from the chamber 56 through the seal 58 into the chamber 57 where it is pivoted on a fulcrum 61. A spring 62 in the chamber 57 acts between the housing 55 and one end 63 of lever 59 to tend to urge a servovent valve 65 carried by the end 63 of lever 59 against an orifice 66. The force exerted by spring 62 is opposed by the delivery pressure of the pump 11 by means of a conduit 67 which extends between the throttle control 23 and one side of a diaphragm 68 located in the housing 55 of the delivery pressure control 52. The other side of the diaphragm 68 is engaged by a pin 69 carried by lever 59. The pin 69 is on the same side of fulcrum 61 as the end 63 of lever 59.

In the chamber 56 of the delivery pressure control 52, an evacuated spring bellows 71 acts between the housing 55 and the other end 72 of the lever 59. A conduit 73 leading into the chamber 56 is connected to the outlet of the compressor 162 of the engine so that the pressure in chamber 56 is the compressor delivery pressure of the engine. The force exerted by the bellows 71 on the lever 59 can be adjusted by an adjuster 74 and the force exerted by the spring 62 on the lever 59 can be adjusted by an adjuster 70.

The delivery pressure control 52 controls the servomechanism 54 through a conduit 75 which leads from the orifice 66 to the circuit control valve 53. When the aircraft is in forward flight and the additional burners are operating, the circuit control valve 53 brings the conduit 75 into communication with a conduit 76 which leads to one side of a piston 77 carried by the valve 18. The piston 77 forms part of the servomechanism 54 and is slidably mounted in a cylinder 78. High pressure fuel from conduit 46 passes through a conduit 79 to the other side of piston 77 and through a restrictor 81 to the conduit 76. A helical spring 82 acts against piston 77 to tend to open the valve 18.

In the delivery pressure control 52, the compressor discharge pressure (or other suitable engine pressure signals, the choice of which is dependent upon the particular engine configuration or requirement) in chamber 56 acts in opposition to the pump delivery pressure acting on diaphragm 68. The position of piston 77 is determined by the rate of flow of fuel through restrictor 81 which is determined by the rate of flow of fuel through orifice 66 and therefore by the position of lever 59 carrying the servovent valve 65. The delivery pressure control 52 is arranged to control the delivery pressure of the vapour core pump 11 by regulating the rate of flow of fuel into the pump 11 through the orifice 16 so that delivery pressure of the pump 11 is a substantially linear function of compressor delivery pressure. Variation of the inlet orifice 16 varies the radial depth of the annulus of fuel in the vapour core pump and hence varies the delivery pressure of the pump. The operation of the pump is more fully described in U.S. Patent No. 3,128,822.

The circuit control valve 53 comprises a housing 83 in which is a rotatable sleeve 84. This sleeve 84 has a number of apertures which are caused to be aligned with or to be put out of alignment with apertures in the housing 83, when the sleeve is rotated. The sleeve 84 is equipped with a flange 180 by which it is rotated in conjunction with the nozzle 165 on the engine. The sleeve 84 may be in either one of two positions depending upon the position of the nozzle. Its rotation is effected through a pivotally interconnected linkage between the flange 180 and lever 32 of the throttle control 23. The linkage is comprised of link 182 and bell crank 184, the latter being connected to flange 180 to effect rotation of the sleeve. The circuit control valve 53 also includes a spool 85 slidable in the sleeve 84 and controlled by the main throttle lever 35 through lever 86, lever 87 which carries a cam 88, cam follower 89 carried by lever 91 and rod 92. A spring 93 urges the spool 85 in one direction. The function of the circuit control valve 53 will be seen when the operation of the afterburner fuel system is described. Some of the apertures in the housing 83 are connected to the sump pump of the aircraft fuel tanks by a conduit 90. Other conduits 98, 99 lead to opposite sides of the piston in the wedge adjusting jack 174.

Between the outlet 19 of the vapour core pump 11 and the non-return valve 21, a conduit 101 leads to a conduit 102 communicating with the atmosphere. Conduit 101 is closed by a valve 103 when the additional burners are operative by means of high pressure fuel from the conduit 76 passing along a conduit 104 and acting on the valve 103. If pressure in conduit 76 and therefore in conduit 104 falls, then a spring 105 urges the valve 103 to an open position.

The electrical circuit to the solenoid valve 43 is fed by the alternating current supply in the aircraft, as represented by terminals 182, and is controlled by three switches, 106, 107 and 181 (FIGURE 1). The switch 106 is closed by bell crank 178 when the nozzle 65 is adjusted for transitional flight; and is opened when the nozzle is adjusted for forward flight. The two remaining switches 107 and 181 are operated by cam 183 which is rotated by link 86 on rotation of the pilot's control lever 35. The latter switches are operated successively during movement of the pilot's lever, the switch 107 being switched on at approximately 50% maximum speed and the switch 181 being switched on at approximately 95% maximum speed.

The electrical wiring of the various switches is indicated in dotted lines. Since switch 106 is closed during transitional flight, closure of switch 107 is effective to supply fuel to the afterburners over the range of engine speeds which are normally used during transitional flight. On the other hand, switch 106 is open during forward flight, and therefore, closure of switch 107 is ineffective to initiate fuel flow to the afterburners during this time.

It will be seen, however, that the switch 181 is connected in series with the solenoid valve and the power supply so that when switch 181 is operated, the solenoid valve is energized to open the shutoff valve 15 and allow fuel flow to the pump 11. Thus, the switch 181 is available for use in horizontal flight to provide extra thrust at or near the maximum speed of the engine.

For all positions of the pilot's throttle lever 35 up to maximum engine speed, the spool 85 of circuit control valve 53 assumes the position shown in FIGURE 2 (and FIGURE 3); when the nozzle 165 is in position for transitional flight, the sleeve 84 of circuit control valve 53 assumes the position shown in FIGURE 2.

The operation of the fuel system will now be described.

1. *Transitional flight (FIGURE 2)*

When the nozzle 165 is in such a position that the thrust from the engine supports or partly supports the weight of the aircraft, that is, when the nozzle is deflected from horizontal attitude for takeoff and landing, the various parts of the fuel system are actuated as shown in FIGURE 2. The operation of the fuel system with the nozzle in this attitude for takeoff and landing causes the rate of fuel flow to the afterburners to be proportional to the rate of fuel flow to the main burners.

Thus it will be seen that the valve 18 of the vapour core pump 11 is maintained in such a position that the orifice 16 is fully open since there is no leak through conduit 76 into the circuit control valve 53 and therefore piston 77 is urged fully to the left. Fuel pressure in conduit 104 also maintains valve 103 in the closed position.

The spool 85 of circuit control valve 53 prevents flow of fuel through conduit 75 and therefore the delivery pressure control 52 has no effect on the system in this case.

Also lever 32 actuates the throttle control 23 so that throttle 25 is operative and throttle 26 is inoperative.

When the pilot's throttle lever 35 reaches the engine speed range in which the additional burners are to operate, switch 107 is closed by lever 35 to actuate the electrical solenoid valve 43, since switch 106 is already closed. Actuation of the solenoid valve 43 moves valve member 49 away from the end of conduit 48 and fuel flows from conduit 48 into conduit 51. Pressure on the side of piston 44 adjacent conduit 48 therefore drops and the resultant force on piston 44 fully opens shutoff valve 15.

As the orifice 16 of the vapour core pump 11 is fully open, fuel flows through conduit 14 into the pump 11, which acts as a normal centrifugal pump. Fuel leaves the pump 11 through outlet 19 and non-return valve 21 and passes along conduit 22 to the throttle control 23. Only throttle 25 is operative in this case and the position of throttle 25 is controlled by the spill valve of the main fuel system so that fuel flow varies with the rotational speed and fuel flow in the main fuel system. By this means the fuel flow is automatically compensated for ambient conditions since this data is fed to the main fuel system. The fuel passes from throttle control 23 into conduit 41 and thence to the afterburners.

During transitional flight, the gas emitted from the engine does not flow past the wedges 172 due to deflection of the nozzle, but the circuit control valve 53 is so arranged that the wedges 172 are moved to give a minimum exit area, so that the wedges 172 are ready in position for forward flight. High pressure fuel flow from conduit 46 passes through conduit 80, through circuit control valve 53 and along conduit 99 to one side of the piston in the wedge adjusting jack 174. The portion on the other side of the piston is connected to the sump pump of the aircraft fuel tanks through conduit 98, circuit control valve 53 and conduit 90. For simplicity the circuit described is applied for two position control of the wedges, but it will be appreciated that fully variable control can be applied.

2. *Forward flight with additional burners inoperative (FIGURE 3)*

For forward flight, the exit nozzle is rotated to give a rearward thrust and this rotation positions the sleeve 84 of the circuit control valve 53 in the position shown in FIGURE 3. The spool 85 remains in the same position as it was for transitional flight since for forward flight with additional burners inoperative the pilot's lever 35 is not pushed through to the maximum speed position. The rotation of nozzle 165 opens switch 106 and also actuates the throttle control 23 to withdraw throttle member 27 to render throttle 25 inoperative and to advance throttle member 28 to bring throttle 26 into operation.

Since the pilot's lever has not been pushed into the maximum speed position the switch 181 remains open and an electrical circuit is not completed to the valve 43. Therefore the shutoff valve 15 will remain closed.

As shown in FIGURE 3, circuit control valve 53 brings conduit 76 into communication with conduit 90 which leads to the sump pump. The resultant pressure drop across restrictor 81 causes piston 77 to move fully to the right and valve member 18 fully closes orifice 16 of the vapour core pump 11. The pressure loss in conduit 76 also causes a pressure loss in conduit 104 and any fuel remaining in pump 11 opens the valve 103 and escapes to atmosphere. Also non-return valve 21 closes. This arrangement is described in U.S. patent application No. 116,824, filed June 13, 1961 and now U.S. Patent No. 3,142,259.

Delivery pressure control 52 remains inoperative since conduit 75 is closed by spool 85. Therefore there is no fuel flow through the system since both the shutoff valve 15 and orifice 16 are closed.

The circuit control valve 53 maintains a supply of fuel under pressure from conduit 80 to the chamber of the jack 174 to maintain the wedges in position to give a minimum area exit of nozzle.

3. Forward flight with additional burners operative (FIGURE 4)

To obtain operation of the additional burners on forward flight, the engine must first be accelerated to a maximum speed which is arranged to be 95% of the maximum speed permitted for transitional flight. At this maximum speed, the pilot's lever 35 causes switch 181 of the solenoid valve 43 to be closed, spool 85 of the circuit control valve 53 to be moved to the position shown in FIGURE 4, and the cam 38 to operate throttle 26 in dependence on the position of pilot's lever 35.

The closing of switch 181 actuates the solenoid valve 43 and shutoff valve 15 is opened. The new position of spool 85 of the circuit control valve 53 brings conduit 76 into communication with conduit 75 to render the delivery pressure control 52 operative, and brings conduit 80 into communication with conduit 98 so that the wedges 172 are moved to a maximum open position. Pressure is restored to conduit 104, and valve 103 closes.

As previously explained, delivery pressure control 52 senses the delivery pressure of the pump 11 and regulates this pressure by varying the position of valve 18 to control inlet of fuel to the pump 11. This control causes the pump 11 to function as a vapour core pump and the delivery pressure control 52 is set so that the delivery pressure of the pump 11 as sensed through conduit 67 is a substantially linear function of compressor delivery pressure as sensed through conduit 73.

The actual amount of fuel is regulated by the pilot's lever 35, movement of which controls the position of throttle 26. Fuel leaves the throttle 26 and passes through conduit 41 to the afterburners. When maximum fuel flow is desired, throttle 26 is in a fully withdrawn position relative to throttle member 28 and therefore, since the fuel pressure at a position upstream of the throttle 26 is a substantially linear function of compressor delivery pressure and the afterburners give a fuel flow which is a substantially linear function of fuel pressure, fuel flow will be a substantially linear function of compressor delivery pressure.

In describing the fuel system shown in FIGURE 5, the same reference numerals will be used where possible to indicate those parts which are similar to the fuel system shown in FIGURES 2 to 4, but it will be noted that some of these parts are in different positions of the drawing.

Should the additional burners not be required, FIGURE 5 shows an alternative system which is not dependent upon the pressure flow characteristics of the particular burner. FIGURE 5 shows the system as it is for forward flight with additional burners operative. The function of the system for transitional flight with additional burners operative and forward flight with additional burners inoperative is essentially the same as the system shown in FIGURES 2 to 4.

The main differences are that the throttle 26 controlled by the pilot's lever 35 is replaced by a flow control 111 controlled by compressor delivery pressure and the pilot's lever 35, and the delivery pressure control 52 is replaced by a pressure drop control 112 which controls the inlet orifice 16 of the pump 11 to maintain a constant pressure drop across the flow control 111.

The fuel control 111 includes a housing 113 having an inlet 114 into which fuel from the pump 11 passes by means of conduit 22. The fuel flows through a bore 115 in the flow control 111 and leaves through an outlet 116 leading to a conduit 117. This conduit 117 leads to modified throttle control 23a and then fuel flows through conduit 41 to the afterburners.

Located in the bore 115 is a sleeve 118 containing a spool valve 119. Fuel enters the sleeve 118 through apertures 121 whose area is controlled by spool valve 119 and leaves the sleeve 118 through apertures 122. The spool valve 119 is connected to a servopiston 123 slidable in an extension 124 of sleeve 1118 and is urged towards a position in which it closes the apertures 121 by a spring 125.

High pressure fuel enters the flow control 111 through a conduit 126 communicating with one side of piston 123. A conduit 127 containing a restrictor 128 brings this side of the piston 123 into communication with the other side of the piston 123. From this other side of piston 123 a conduit 129 is brought into communication by circuit control valve 53 with a conduit 131 in the housing 113. The end of conduit 131 in housing 113 is controlled by a servovent valve 32 carried by a lever 133 pivoted at a fulcrum 134. On the same side of the fulcrum 134 as the servovent valve 132, the end of the lever 133 is acted on by spring 135 acting between lever 133 and spool valve 119 and by spring 136 acting between lever 133 and the housing 113. Spring 136 is adjustable by means of an adjuster 137.

The other end of the lever 133 is acted on by a bellows 138 to which is fed air at a pressure which is a certain fraction of compressor delivery pressure through conduit 139 and also by a bellows 141 to which is fed air at a pressure which is a variable fraction of compressor delivery pressure through conduit 142. This fraction is determined by movement of pilot's lever 35 after it has been pushed beyond the predetermined position. Compressor delivery pressure is delivered through a conduit 143 which includes a restrictor 144. From restrictor 144, air can pass to conduit 142 or to the atmosphere through a variable restrictor 145 which is varied by movement of pilot's lever 35. The actual setting of variable restrictor 145 determines the actual fraction of compressor delivery pressure in bellows 141.

The pressure drop control 112 includes a housing 146 containing a diaphragm 147. From a chamber 140 on one side of the diaphragm 147, a conduit 148 leads to the conduit 115 at a position adjacent the apertures 121 and from a chamber 160 on the other side of the diaphragm 147, a conduit 149 leads to the conduit 117. A spring 150 acting between the housing 146 and the diaphragm 147, urges the diaphragm 147 in one direction and is adjustable by an adjuster 151. A wall 152 in the housing 146 divides the chamber 140 from a chamber 153 in which is located a lever 154 pivoted at one end on a fulcrum 155. A pin 156 in contact with the diaphragm 147 extends through the wall 152 and engages the other end of lever 154 on one side. The other side of this end of lever 154 carries a servovent valve 157 which operates on the end of a conduit 158 which leads to the circuit control valve 53. The control valve 53 brings conduit 158 into communication with conduit 76.

As mentioned previously, the operation of this fuel system for transitional flight with additional burners operative and forward flight with additional burners inoperative is similar to the operation of the fuel system shown in FIGURES 2 to 4 and therefore the operation of this fuel system will be described only for forward flight with additional burners operative, a condition shown in FIGURE 5.

As pilot's lever 35 is pushed beyond the predetermined position, switch 181 of the solenoid valve 43 is closed, spool 85 of circuit control valve is moved to the position shown in FIGURE 5 and pilot's lever 35 commences to actuate variable restrictor 145.

The actuated solenoid valve 43 opens shutoff valve 15 and movement of spool 85 brings various conduits into communication with other conduits as described above.

Pressure drop control 112 controls the setting of servopiston 77 and hence the valve 18 to regulate the delivery of the vapour core pump 11 so that the pressure difference between conduits 148 and 149, that is the pressure drop across apertures 121 and 122 in sleeve 118, is substantially constant.

At the begining of fuel flow range, pilot's lever 35 causes a minimum resistance to flow in restrictor 145 and thus the pressure in bellows 141 is relatively low.

The servovent valve 132 therefore tends to close and the servopiston 123 is moved to reduce the size of the apertures 121.

As the pilot selects more fuel flow, pilot's lever 35 causes a greater restriction in restrictor 145 and therefore greater pressue in bellows 141 and consequent increase in size of apertures 121.

The flow control 111 is arranged so that the area of the apertures 121 is a substantially linear function of compressor delivery pressure and therefore the fuel flow rate is a substantially linear function of compressor delivery pressure.

When in transitional flight, the fuel flow is controlled by throttle 25 and the circuit control valve 53 blanks off the flow of servo fuel to both the pressure drop control 112 and the flow control 111.

I claim as my invention:

1. In a liquid flow system which is adapted to supply liquid under two sets of operating conditions, a centrifugal pump having an inlet connection and an outlet connection, means for controlling the flow of liquid into the pump by throttling the inlet connection, means for controlling the flow of liquid out of the pump by throttling the outlet connection, means operable to program the operation of the inlet and outlet flow control means whereby the inlet flow control means is caused to throttle the inlet connection under one set of operating conditions, and the outlet flow control means is caused to throttle the outlet connection under the other set of operating conditions, and means interconnecting the inlet and outlet flow control means whereby each flow control means is opened fully to flow and therefore rendered inoperative to throttle its respective connection, when the other of the flow control means is caused to throttle its respective connection.

2. A liquid flow system according to claim 1, wherein the pump is driven at a predetermined speed and the inlet flow control means is operable to vary the rate of liquid flow into the pump in accord with a demand which is variable over a predetermined range of flow rates having an upper limit of less than the delivery rate of the pump at said speed so that liquid flowthrough in the pump assumes the form of an annulus in the relatively peripheral portion thereof, the relatively axial portion of the chamber being closed to atmosphere so that a hollow core is formed centrally of the liquid annulus to enable the annulus to compensate for variation in the hydraulic load at a particular demand by adjusting its radial depth.

3. A liquid flow system according to claim 1 further comprising additional flow control means operable to sense the pressure of liquid flow in the outlet connection, when the inlet flow control means is operative to throttle the inlet connection, and to adjust the rate of liquid flow in the inlet connection, through the medium of the inlet flow control means, so as to maintain a predetermined pressure in the liquid flow in the outlet connection.

4. A liquid flow system according to claim 3 wherein the additional flow control means is operable to adjust the rate of liquid flow in the inlet connection, so as to maintain the predetermined pressure at a value which is variable in accord with a variable signal.

References Cited by the Examiner

UNITED STATES PATENTS

| 2,645,410 | 7/1953 | Bauger | 230—114 |
| 2,985,107 | 5/1961 | Anderson | 103—97 |
| 3,034,582 | 5/1962 | Bollinger | 244—7 |
| 3,067,576 | 12/1962 | Campbell et al. | 60—35.6 |
| 3,085,395 | 4/1963 | O'Neill | 60—35.6 |
| 3,087,691 | 4/1963 | Rainbow | 60—35.54 |
| 3,100,377 | 8/1963 | Kosin | 60—35.54 |
| 3,128,822 | 4/1964 | Tyler | 158—36.3 |
| 3,142,259 | 7/1964 | Tyler | 103—97 |

FOREIGN PATENTS

| 272,519 | 12/1927 | Great Britain. |
| 733,931 | 7/1955 | Great Britain. |
| 785,803 | 11/1957 | Great Britain. |
| 842,354 | 7/1960 | Great Britain. |

JULIUS E. WEST, *Primary Examiner.*